(12) United States Patent
Henning (10) Patent No.: US 6,474,719 B2
(45) Date of Patent: Nov. 5, 2002

(54) TARP ROLL HAVING INTERNAL DRIVE MEANS

(75) Inventor: Steven A. Henning, Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/907,562

(22) Filed: Jun. 7, 2001

(65) Prior Publication Data

US 2002/0033615 A1 Mar. 21, 2002

Related U.S. Application Data

(62) Division of application No. 09/330,143, filed on Jun. 11, 1999, now Pat. No. 6,338,521.

(51) Int. Cl.⁷ .............................. B60P 7/04; B60P 7/02; B60J 11/00
(52) U.S. Cl. ............... 296/98; 296/100.14; 296/100.15; 296/100.16
(58) Field of Search .............................. 296/98, 100.14, 296/100.15, 100.16

(56) References Cited

U.S. PATENT DOCUMENTS

| | | | | |
|---|---|---|---|---|
| 2,898,147 A | * | 8/1959 | Horner | 296/98 |
| 3,146,824 A | * | 9/1964 | Veilleux | 296/98 |
| 3,549,198 A | * | 12/1970 | Cappello | 296/98 |
| 3,759,568 A | * | 9/1973 | Unruh | 296/98 |
| 4,842,323 A | * | 6/1989 | Trickett | 296/98 |
| 5,031,955 A | * | 7/1991 | Searfoss | 296/98 |
| 5,125,713 A | * | 6/1992 | Willingham et al. | 296/98 |
| 6,053,556 A | * | 4/2000 | Webb | 296/98 |
| 6,161,893 A | * | 12/2000 | Ewing et al. | 296/98 |

* cited by examiner

Primary Examiner—D. Glenn Dayoan
Assistant Examiner—Hilary Gutman
(74) Attorney, Agent, or Firm—Maginot, Moore & Bowman, LLP

(57) ABSTRACT

An improved tarp cover system for covering the open-topped container body of a vehicle is characterized by the provision of generally U-shaped inverted hold-down arm that is pivotally connected with the front wall of the container body and that is spring biased to apply a downward force on the front portion of the cover when the container is in the completely closed condition, thereby to reduce flapping of the cover during transport. The flexible tarp cover is wound on a roll that is rotatably supported adjacent the front wall of the container. In a first embodiment, to cover the container, the free end of the cover is displaced rearwardly of the container by a cover arm that is pivotally connected with the side walls of the container. The cover arm is biased toward its rearmost container covering position by a pair of side mounted spring arrangements that include compression springs that are concealed within the hollow leg portions of the cover arm. A locking arrangement is provided for automatically locking the cover arm in its rearmost position when the tarp completely covers the container. In an alternate embodiment, the cover is unwound from the roll by a transverse member that is manually pulled to the rear of the container by a pull rope. The cover is wound on the roll by an electric motor that is connected with the roll via a planetary gearing arrangement, or by a spring motor.

3 Claims, 10 Drawing Sheets

TARP ROLL HAVING INTERNAL DRIVE MEANS

This is a division of application Ser. No. 09/330,143, filed Jun. 11, 1999, now U.S. Pat. No. 6,338,521.

BACKGROUND OF THE INVENTION

1. Field of the Invention

A tarp cover system for covering an open-topped vehicle container body includes a hold-down arm that is connected with the front end of the container body for applying downward tension upon the front end of the cover, thereby to reduce flapping of the cover during vehicle transport. The arm has a generally U-shaped inverted configuration and includes a transverse portion that is less than the width of the container body so that the arm can extend downwardly to some extent between the side walls of the container body.

2. Brief Description of the Prior Art

Tarp cover systems for covering the open-topped containers of dump trucks and trailers are well known in the patented prior art, as illustrated by the patents to Searfoss U.S. Pat. No. 5,031,955, Tuerk U.S. Pat. No. 4,740,029, and Compton U.S. Pat. No. 4,516,802, among others. The Tuerk patent addresses the problem of applying tension to the rear portion of the cover to tighten the same when in the container-covering condition, and in the Searfoss patent, tension is applied to the front portion of the cover by a hold-down arm that is pivotally connected with the main cover arm that straddles the container body and is pivotally operable to cover and uncover the container body. In the Compton patent, the main cover arm that is pivotally connected with the container body is spring-biased toward the tarp covering position by exposed spring means.

The present invention was developed to provide an improved tarp cover system in which the hold-down means is operable independently of the cover arm and is operable to extend downwardly to some extent between the side walls of the container body, thereby to improve the hold-down functioning of the cover at the front end of the truck. The spring biasing means for the main cover arm are concealed in protected relation within the legs of the cover arm, and improved means are provided for automatically locking the cover to the container body when the cover arm is in its fully closed covering position. Improved drive-motor/gearing means serve to wind the tarp cover on the cover roll against the biasing force of the spring means.

SUMMARY OF THE INVENTION

Accordingly, a primary object of the present invention is to provide an improved tarp cover system for open-topped vehicle container bodies including a hold-down arm that is pivotally connected with the front end of the container body and is spring-biased to apply a downward tensioning force to the front end of the cover when the cover is in the container-covering condition.

According to a more specific object of the invention, the hold-down arm is of generally U-shaped inverted configuration and includes a transverse portion the length of which is less than the spacing distance of the side walls of the container body, whereby the hold-down arm can extend to some extent downwardly between the side walls, thereby to more positively-tension and hold down the front portion of the tarp cover when the tarp is in the container-covering condition. Thus, when the hold-down arm is pivotally connected with the ledge portion of a truck body that extends over the cab of the truck, the hold-down arm can operated to tension the forward portion of the cover against the rear edge of the ledge portion of the container body, thereby to assure positive hold down of the front portion of the tarp.

In accordance with a further object, the leg portions of the hold-down arm are sectional and include a plurality of angular adjustable sections, thereby to permit desired hold-down operation for various sizes and designs of the trucks wit which the tarp cover system of the present invention is to be used.

According to another object of the invention, improved side mounted spring means are provided for biasing the main cover arm rearwardly toward its container-covering position, the spring biasing means including compression springs that are concealed within the hollow leg portions of the main cover arm.

A further object of the invention is to proving improved means for automatically locking the main cover arm in its container-covering position.

Still another object of the invention is to provide improved motor/gearing means for winding the tarp cover upon a roll against the biasing force of the side-mounted spring-biasing means associated with the main cover arm.

BRIEF DESCRIPTION OF THE DRAWINGS

Other object and advantages of the invention will become apparent from a study of the following specification, when viewed in light of the accompanying drawings in which.

DETAILED DESCRIPTION

Figures 1, 2, 3, 4:
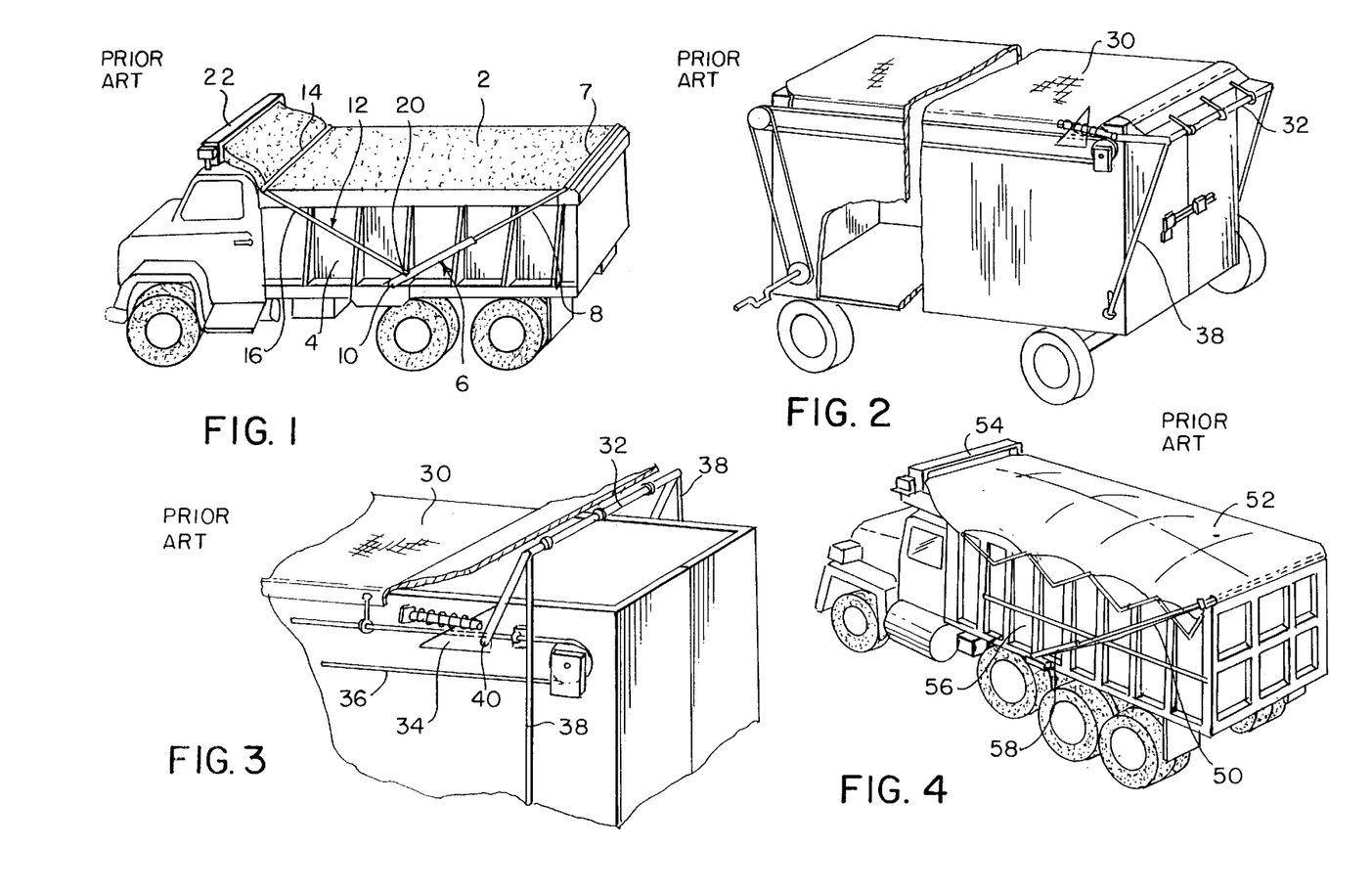
FIG. 1 is a side perspective view of a tarp cover system of the prior art, as illustrated by the Searfoss U.S. Pat. No. 5,031,955.
FIG. 2 is a rear perspective view of the truck tarp cover system of the Tuerk U.S. Pat. No. 4,740,029.
FIG. 3 is a detailed perspective view of the rear portion tarp cover system of FIG. 3.
FIG. 4 is a rear perspective view of a tarp cover system of the prior art, as illustrated by the Compton U.S. Pat. No. 4,516,802.

Referring first more particularly to FIG. 1, in the tarp cover system of the prior Searfoss U.S. Pat. No. 5,031,955, the tarp cover 2 for covering the truck body 4 includes a cover arm 6 having a generally U-shaped inverted configuration including a pair of leg portions 8 that extend downwardly adjacent the external surfaces of the side walls of the vehicle body. The lower free ends of the legs 8 of the cover arm are connected by pivot means 10 with the lower central portion of the vehicle body. In this system, a second hold-down arm 12 is provided of generally U-shaped inverted configuration having a transverse portion 14 and a pair of downwardly extending leg portions 16 which are connected by pivot means 20 with the leg portions of the main cover arm 6. Thus, when the cover arm 6 is pivoted rearwardly to the illustrated tarp covering position, the cover 2 is progressively withdrawn from the roll 22 to completely cover the truck body, and the transverse portion 14 of the hold-down arm 12 is displaced to press the front portion of the cover downwardly adjacent the front end of the vehicle body.

Referring now to FIGS. 2 and 3, in the Tuerk Pat. U.S. No. 4,740,029, the rear end of the tarp cover 30 is tensioned by means of a generally U-shaped inverted tensioning arm 32 having leg portions that are pivotally connected with a carrier 34 by pivot means 40. When the rear end of the cover 30 and the carrier 34 are displaced rearwardly by the endless cable means 36, upon an application of force to the pull down ropes 38, the tensioning arm 32 is pivoted downwardly to applied tension to the rear portion of the cover as shown in FIG. 2.

Referring to FIG. 4, in the Compton U.S. Pat. No. 4,516,802, the pivotally connected generally U-shaped inverted cover arm 50 is biased rearwardly by the exposed spring means 58 toward the covering position illustrated in FIG. 4.

Figure 5:
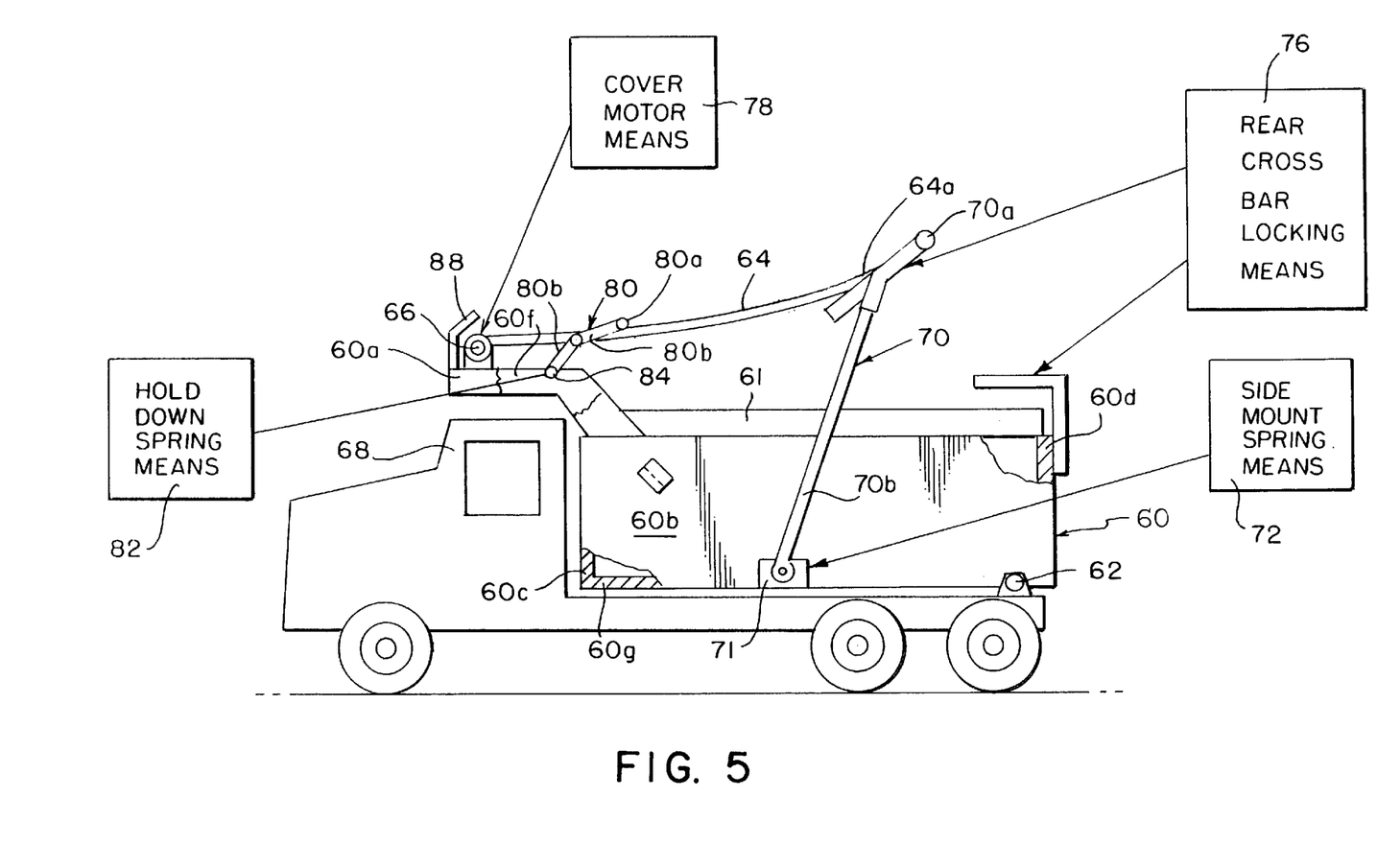
FIG. 5 is a side elevational view of the improved tarp cover system of the present invention.
Figures 10, 11, 12, 13, 14:
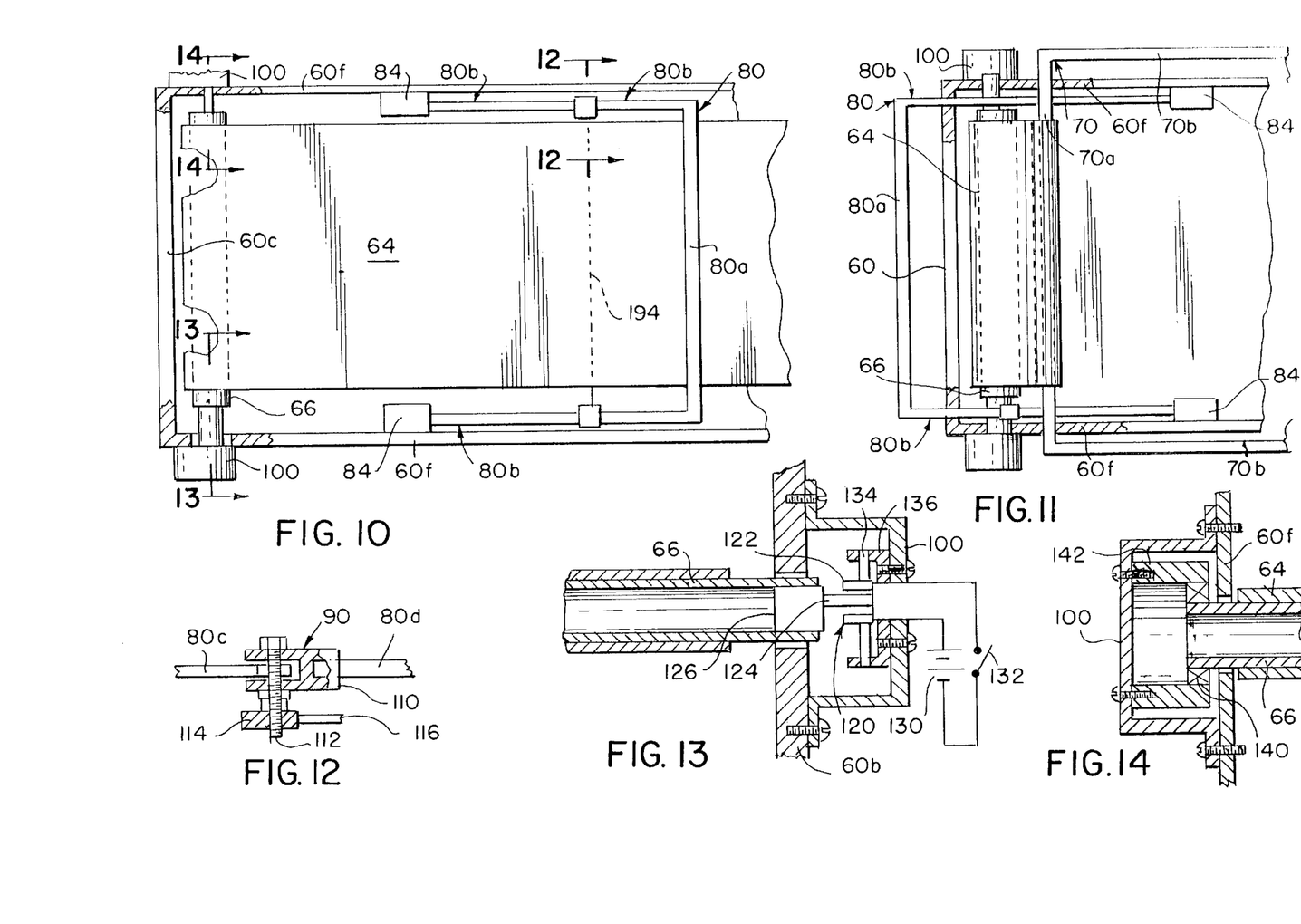
FIG. 10 is a detailed top plan view of the hold-out arm means in the hold-down condition of FIG. 7.
FIG. 11 is a detailed top plan view of the hold-down arm means when maintained in its retracted position by the cover arm means.
FIGS. 12, 13, and 14 are detailed sectional views taken along the lines 12—12, 13—13, and 14—14, respectively, of FIG. 10.

Referring now to FIG. 5, the tarp cover system of the present invention is operable to cover the open top of a vehicle container body 60 having front, rear, side, and bottom walls. Wooden side rails 61 may be provided at the top of the side walls, if desired. In the illustrated embodiment, the vehicle is a dump truck in which the vehicle body 60 is pivoted about pivot means 62 from its illustrated transport position to a tilted rear discharge position, as is known in the art. The tarp cover 64 is supplied from a roll 66 that is rotatably mounted on the container body ledge portion 60a that extends above the cab 68. The cover arm 70 is of generally U-shaped inverted configuration (as shown in FIG. 11) having a pair of leg portions 70b that extend downwardly adjacent the external sides of the side walls 60b of the vehicle body 60, respectively. The free end 64a of the cover is connected with the transverse portion 70a (FIG. 11) of the tarp cover arm 70. At their lower ends, the leg portions 70b are pivotally connected with the lower central portion of the vehicle body 60 by pivot means 71 including side mount spring means 72, as will be described in greater detail below. The cover arm 70 is normally spring-biased rearwardly toward a first position in which the open-topped container body is completely covered by the tarp cover 64. As will be described in greater detail below, in accordance with a second feature of the invention, rear cross bar locking means 76 are provided for automatically locking the cover arm in its first tarp covering position., and according to a third feature of the invention, cover motor means 78 are provided for winding the cover on the cover roll 66, whereby the cover arm 70 is pivoted forwardly of the vehicle body 60 toward a retracted position illustrated in FIG. 11.

In accordance with a primary characterizing feature of the invention, spring-biased hold-down arm means 80 are provided for pressing down the forward portion of the cover 64 when the cover arm 70 is in its rearmost first position, thereby to apply a downwardly directed force to the front portion of the cover and thus prevent flapping of the forward portion of the cover during travel of the vehicle down a highway. The hold-down 80 is of generally U-shaped configuration and includes a transverse portion 80a (FIGS. 10 and 11) and a pair of leg portions 80b that are pivotally connected at their lower ends with the ledge portion 60a of the vehicle body by pivot means 84 that include the hold-down spring means 82, as will be described below. A conventional wind screen 88 is provided at the forward end of the ledge portion 60a, thereby to shield the tarp cover roll 66 against the wind during travel of the vehicle.

Figure 6:
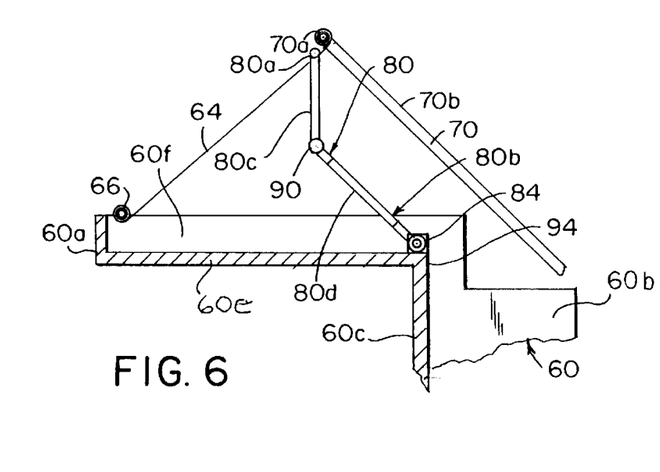
FIG. 6 is a detailed sectional view of as first embodiment of the hold-down arm means of the present invention.

Referring now to FIG. 6, the hold-down arm means 80 is pivotally connected by the pivot means 84 adjacent the rear edge 94 of the vehicle body ledge portion 60a. In accordance with an important feature of the invention, the hold down arm means 80 is of sectional construction and includes a pair of leg sections 80c and 80d that are pivotally connected by the adjustment locking means 90.

Figure 7:
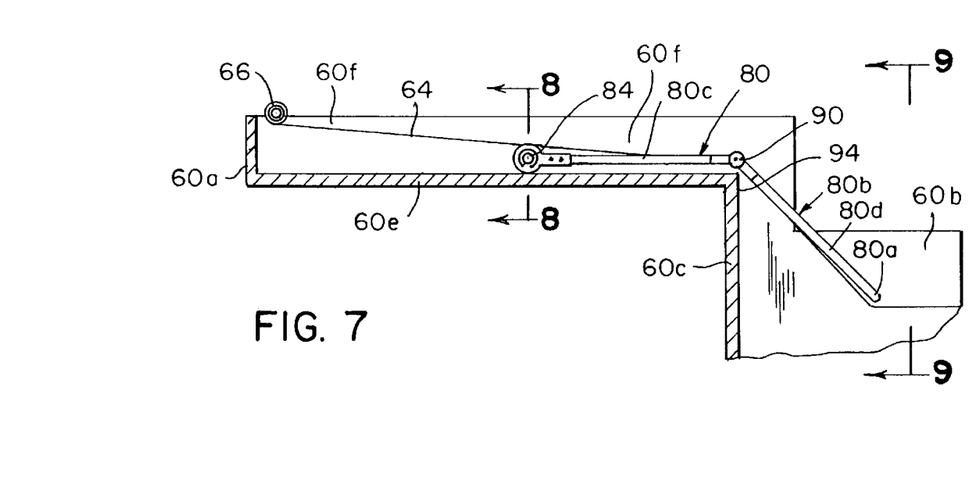
FIG. 7 is a detailed sectional view of a second embodiment of the hold-down arm means of the present invention.

Referring now to the modification of FIG. 7, the pivot means 84 for connecting the leg portions 80b of the hold down arm 80 are connected with the bottom wall 60e of the ledge portions 60a forwardly of the rear edge 94. As shown in FIGS. 7 and 10, the length of the transverse portion 80a of the hold-down arm 80 is less than the spacing distance between the side walls 60b of the vehicle container body 60, whereby when the hold down arm means 80 is in the hold-down condition of FIG. 7, the transverse portion 80a extends between the container side walls and is at an elevation lower than that of the rear edge 94 of the ledge portion 60a, thereby to apply hold-down tension to the forward portion of the cover 64 when the cover arm 70 is in its rear most tarp-covering position.

Figure 8:
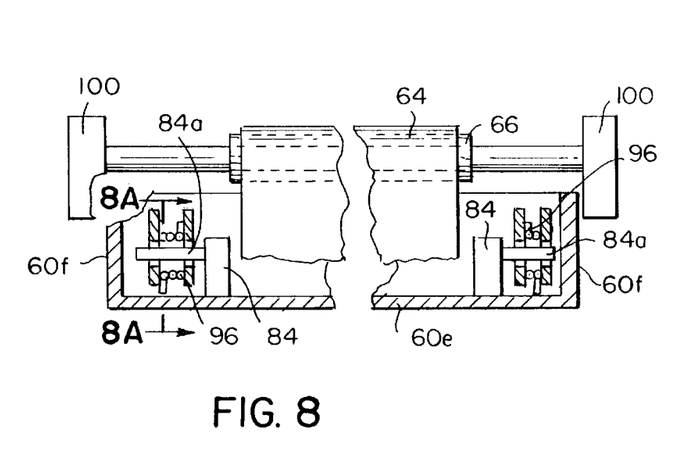
FIGS. 8 and 9 are sectional views taken along lines 8—8 and 9—9, respectively, of FIG. 7.
Figure 8A:
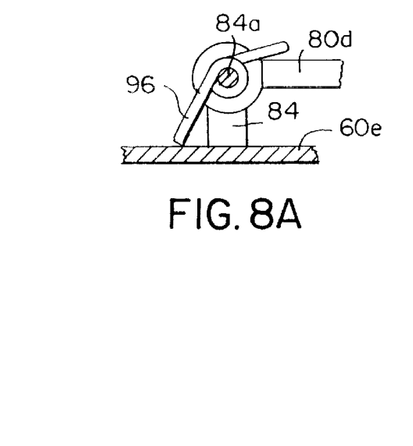
FIG. 8A is a sectional view taken along line 8A—8A of FIG. 8.
Figure 8B:
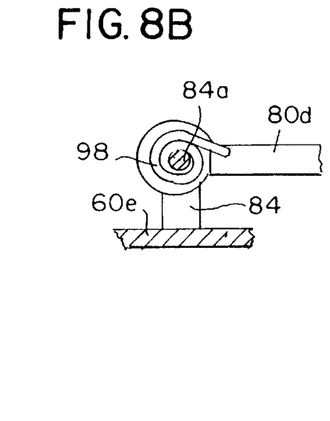
FIG. 8B is a second embodiment of the hold-down arm spring means.
Figure 9:
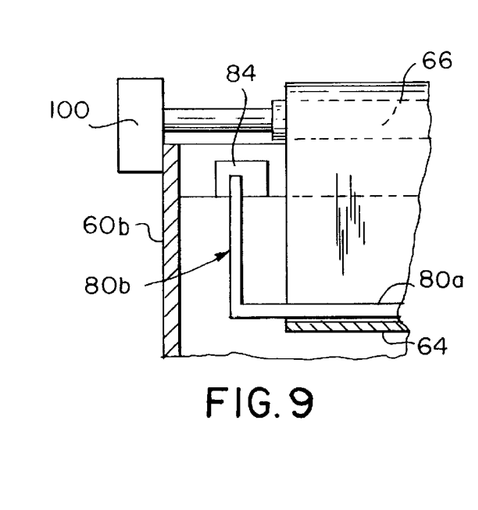

Referring to FIGS. 8 and 9, the pivot support means 84 includes pivot pins 84a about which are pivoted the leg portions 80d of the hold-down 80. Torsion spring means 96 bias the hold-down arm 80 in the clockwise direction toward the hold-down position illustrated in FIGS. 7 and 9. In the embodiment of FIGS. 8 and 8a, the spring means 94 are in the form of torsion springs 96 that react between the ledge bottom wall 60e and the hold-down arm section 80d. In the modification of FIG. 8B, each of the spring means 98 is a spiral spring that reacts between the pivot pin 84a and the section 80d of the hold-down arm 80. The tarp cover roll 66 is rotatably supported at each end by support means 100 connected with the side walls 60f of the ledge portion 60a, as will be described below.

Referring to FIG. 12, the adjustment locking means 90 for pivotally connecting and locking the sections leg 80c and 80d of the hold-out arm means include a bifurcated member 110 that receives the pivot pin 112 about which the section 80c pivots. Upon tightening of the nut 114 upon the threaded pivot pin 112 by the handle means 116, the sections 80c and 80d are adjustably locked in any desired relative orientation.

Referring now to FIGS. 13 and 14, in accordance with an important feature of he invention, the tarp cover roll 66 is rotatably driven by a 12 volt direct-current motor 120 having a stator 122 that is connected with the housing support 100, and a rotor 124 that is connected with the cover roll 66 by planetary gearing means 126. One example of the motor means 120 is the known SOMFY LT motor produced by Somfy Systems, Inc., of Cranbury, N.J. The motor/planetary gearing assembly is electrically driven by the battery 130 in accordance with the actuating position of switch means 132. The motor means 120 is supported from the support housing 100 by means of support pins 134 and bracket 136, as shown in FIG. 13. At its other end, the tarp cover roll 66 is supported by bearing means 140 and mounting bracket 142.

Figure 15:
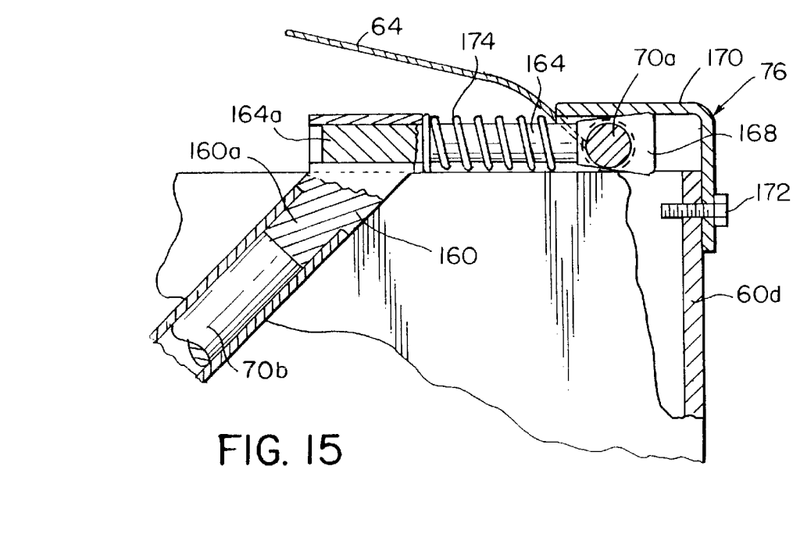
FIG. 15 is a detailed sectional view illustrating the locking means for retaining the cover arm in its rearmost container body covering position.
Figure 16:
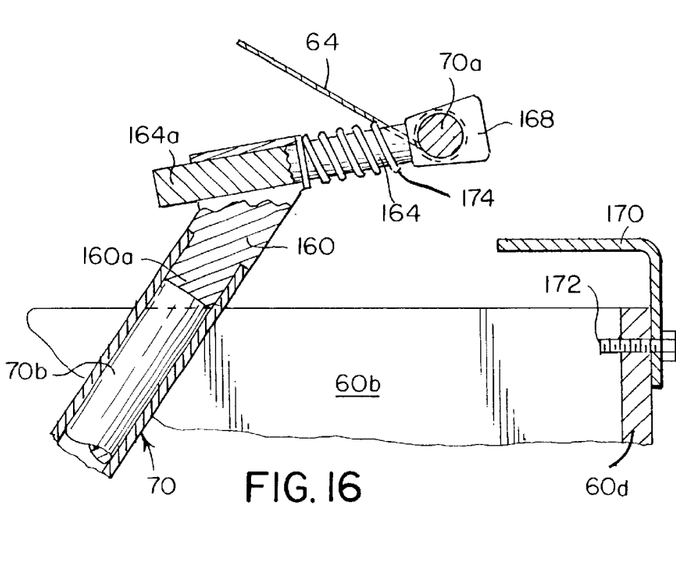
FIG. 16 is a detailed sectional view illustrating the cover arm locking means in its disengaged condition.
Figure 17:
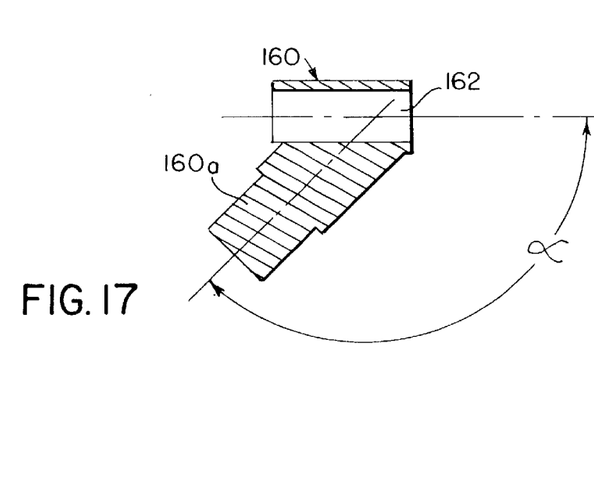
FIG. 17 is a detailed sectional view of the aluminum casting member that forms the support member of the cover arm locking means.

In accordance with another feature of the invention shown in FIGS. 15–17, lock means 76 are provided at the rear wall 60d of the vehicle body 60 for automatically locking the cover arm 70 in its rearmost container-covering first position. To this end, the transverse portion 70a is connected with the arm portion 70b by a self-locking assembly including a pair of cast aluminum fittings 160 each having a plug portion 160a adapted for insertion within the associated tubular end portion of the leg 70b. At its other end, the fitting 160 contains an angularly-arranged through bore 162 that is arranged at the acute angle α and which slidably receives the associated end portion 164a of the connecting rod 164. The other end of the connecting rod is connected with the cover arm transverse portion 70a via a connecting member 168 that supports the transverse portion for insertion within a corresponding L-shaped bracket 170 that is bolted to the rear wall 60d by bolt means 172. A compression spring 174 is mounted concentrically about each connecting rod 164, which spring is captured between the fitting 160 and the locking member 168. As shown in FIG. 16, when the motor means 78 is actuated to roll the tarp cover 64 on the roll 66, the tension of th e cover causes connected rod 164 and the transverse portion 70a to be displaced to the left relative to each cover arm fitting 160, thereby to compress the compression spring 164 as shown in FIG. 16. The locking member 168 is thereby retracted to withdraw the transverse portion 70a from its position within the L-shaped locking brackets 170, whereupon the cover arm 70 is released for pivotal displacement toward its second retracted position in which the cover 64 is rolled upon the roll 66. During the covering operation, the cover arm 70 is biased in the clockwise direction toward its fully covered position shown in FIG. 16, whereupon the cover motor means 78 is deactivated, the tension on cover 64 is released, and compression spring 174 expands to displace the locking member 168 beneath the locking bracket 170, as shown in FIG. 15.

Thus, the rear end of the cover 64 and the cover arm 70 are stabilized by the rear cross bar locking means 76.

Figures 25, 26, 27:
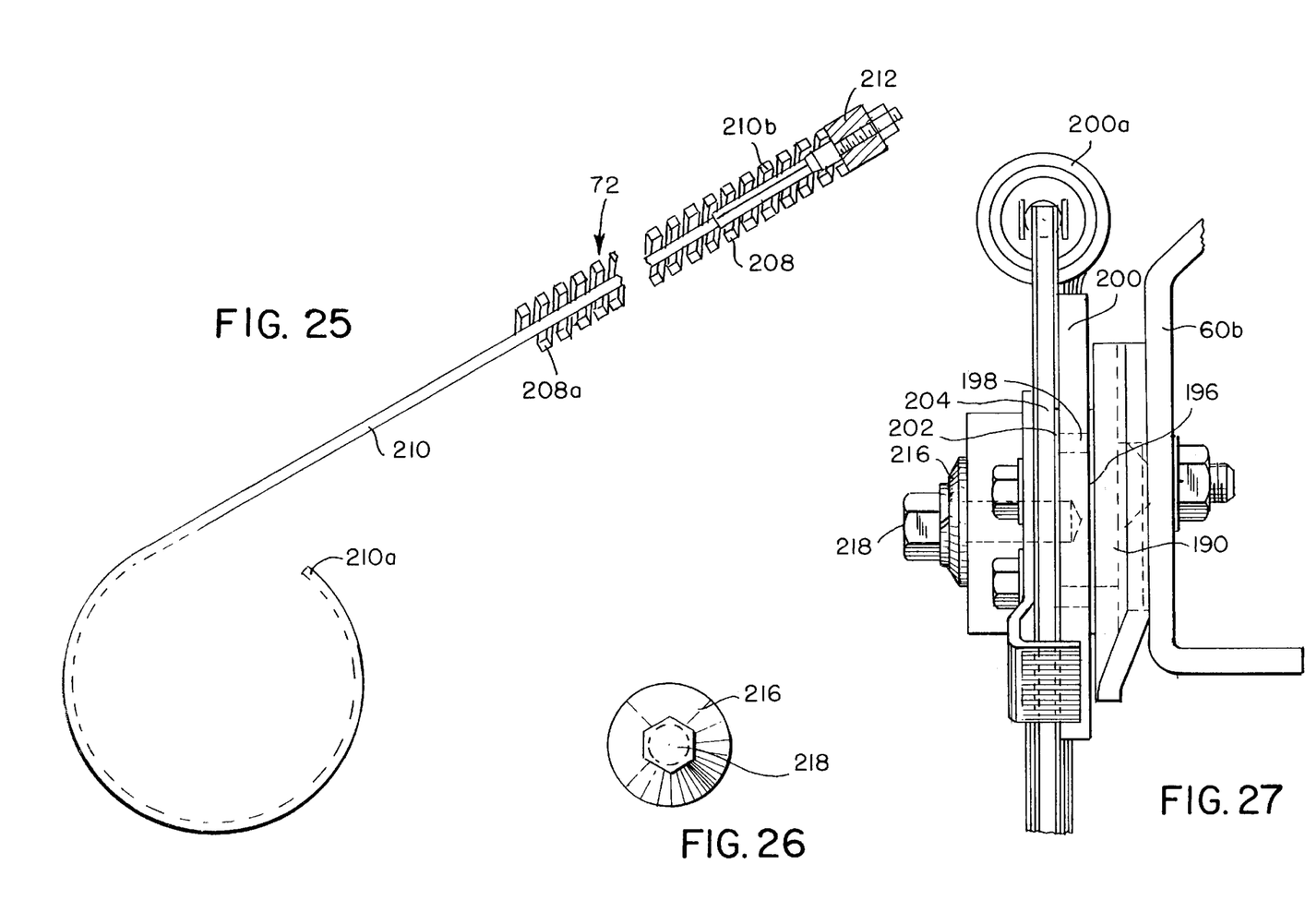
FIG. 25 is an elevational view of the cable and compression spring assembly of FIG. 19.
FIG. 26 is an elevational view of the washer and nut assembly of FIG. 19.
FIG. 27 is a side view of the cover arm biasing means of FIG. 19.

Referring now to FIGS. 18–27, in accordance with a further object of the present invention, the leg portion 70b of the tarp cover arm 70 are pivotally connected with the lower central side portions of the vehicle body by pivot means 72 centrally arranged adjacent the bottom wall 60g of the vehicle body 60. Each of the pivot means on opposite sides of the vehicle body includes a bracket 190 (FIG. 19) supporting a pivot pin 192 containing a key slot 194. Successively mounted on the pivot pin 192 are a thrust washer 196 (FIG. 20), a bearing 198 (FIG. 21) upon which is rotatably mounted a gusset and tube assembly 200 (FIG. 22), a second thrust washer 202 (FIG. 23), and a stationary sheave 204 (FIG. 24) that is keyed to the pivot pin 192 by the key 206. Mounted within the tubular portion 200a of the gusset assembly 200 is a compression spring 208 (FIG. 25). The lower end 208a of which is seated on the upper edge 201 of a second tube 203 that is inserted concentrically within the tubular portion 200a of the gusset 200. Extending concentrically through the compression spring 208 is a cable member 210 that extends around the circumference of the sheave 204 and has an end portion 210a that is clamped to the sheave 204 by clamping means (not shown). The other end 210b of the cable is connected with a piston 212 that rides within the tubular portion 200a of the gusset 200. Preferably, the gusset 200 is formed of a hard metal, such as steel. Finally, a washer 216 and bolt 218 are provided for bolting the parts to the threaded bore 220 contained in the pivot pin 192, as shown in FIG. 27.

Figure 18:
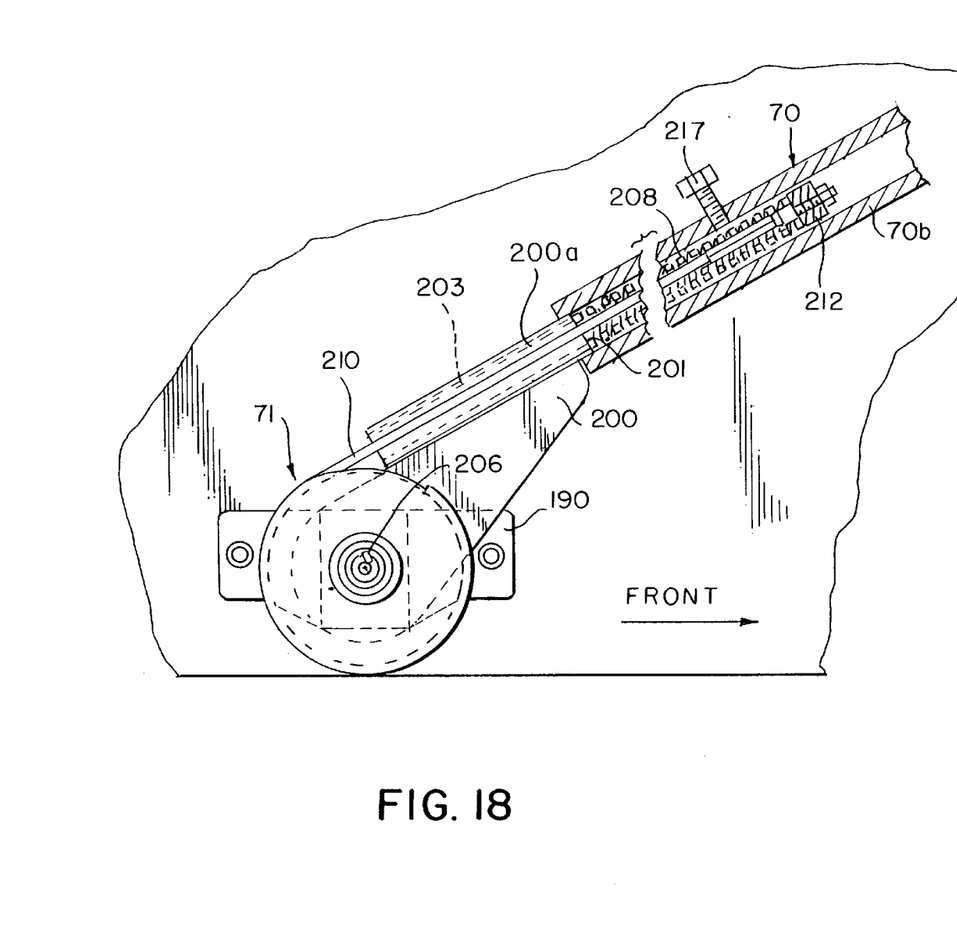
FIG. 18 is a detailed sectional view illustrating the cover arm spring biasing means on the passenger side of the vehicle when in the spring-compressed condition.
Figures 19, 20:
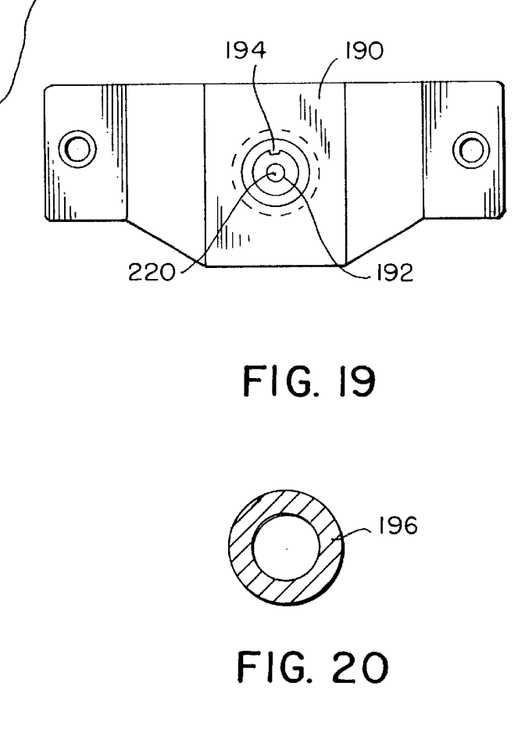
FIG. 19 is an elevational view of the bracket means of FIG. 18.
FIG. 20 is a sectional view of the thrust washer means of FIG. 18.
Figures 21, 22, 23, 24:
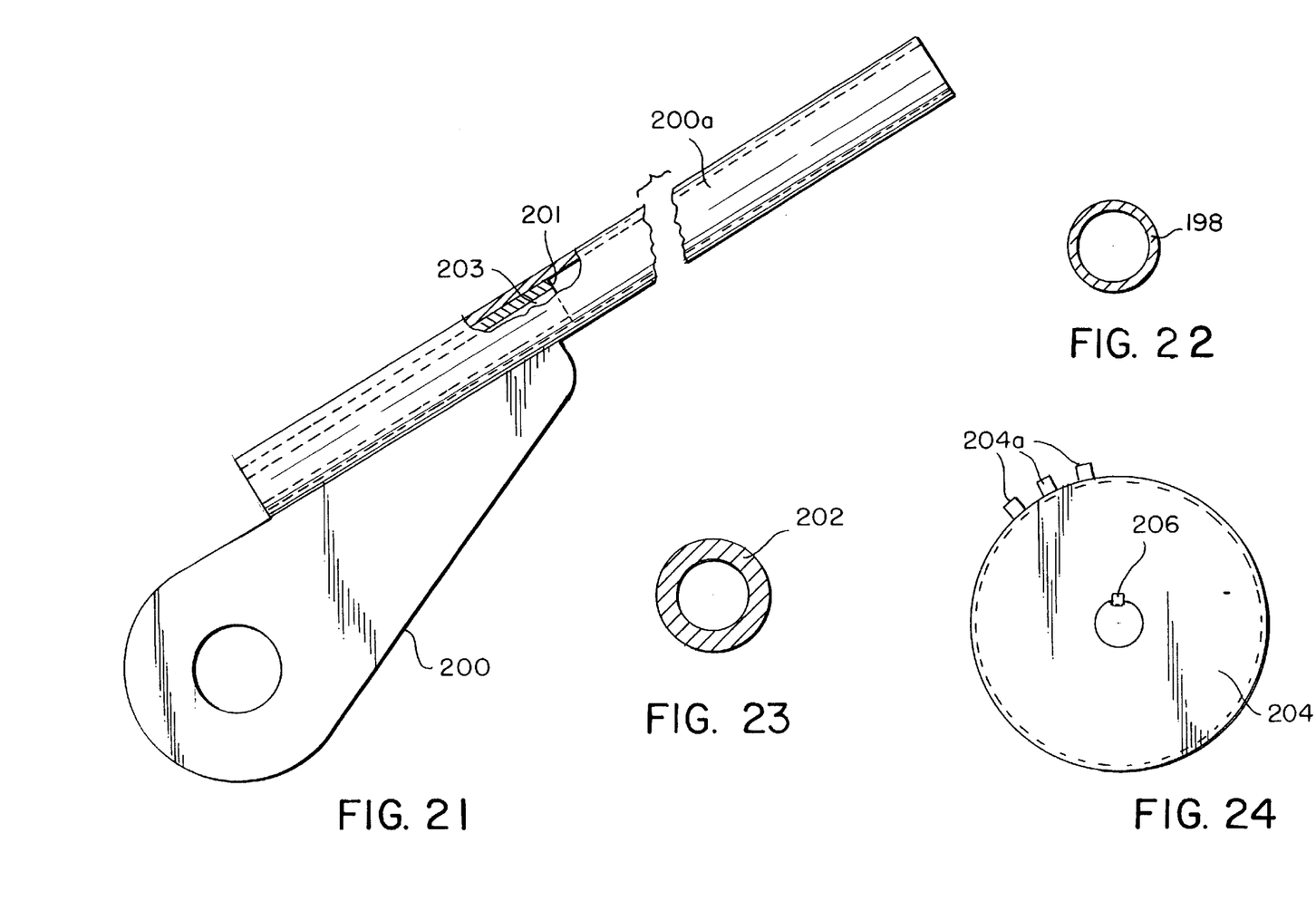
FIG. 21 is a detailed view of the gusset and tube assembly of FIG. 18.
FIGS. 22 and 23 are elevational views of the bearing means of the thrust washer of FIG. 19.
FIG. 24 is an elevational view of the cast sheave of FIG. 19.

Referring again to FIG. 18, assume that the pivot means 71 is on the passenger side of the vehicle, and that the tarp cover arm 70 has been pivoted forwardly toward its second vehicle body uncovering position, whereupon the spring 208 is in a compressed condition owing to the pivotal movement of the gusset arm 200. The tubular steel portion 200a of the gusset 200 extends concentrically within the lower end of the tubular leg portion 70b of the tarp cover arm 70. The tarp cover arm 70 is normally made of a soft material such as aluminum, or a suitable synthetic plastic material. Set screw 216 secures the lower end of the leg portion 70b with the tubular portion 200a of the stainless steel gusset 200. As shown in FIG. 18, the compression spring 208 is concealed in protected relation completely within the stainless steel tubular portion 200a and within the leg portion 70b of the tarp cover arm 70. If desired, the sheave 204 could be provided with sprocket teeth 204a, and instead of a cable 210, a sprocket chain could be provided.

It is important to note that since the spring and adjacent portion of the cable assembly are contained within the tubular portion 200a of the gusset 200 and also within the lower tubular portion of the leg 70b, the spring assembly is protected against weather and damage. The width of the assembly from the bottom rail of the vehicle container is less than three inches, thereby affording a low profile.

Figure 28:
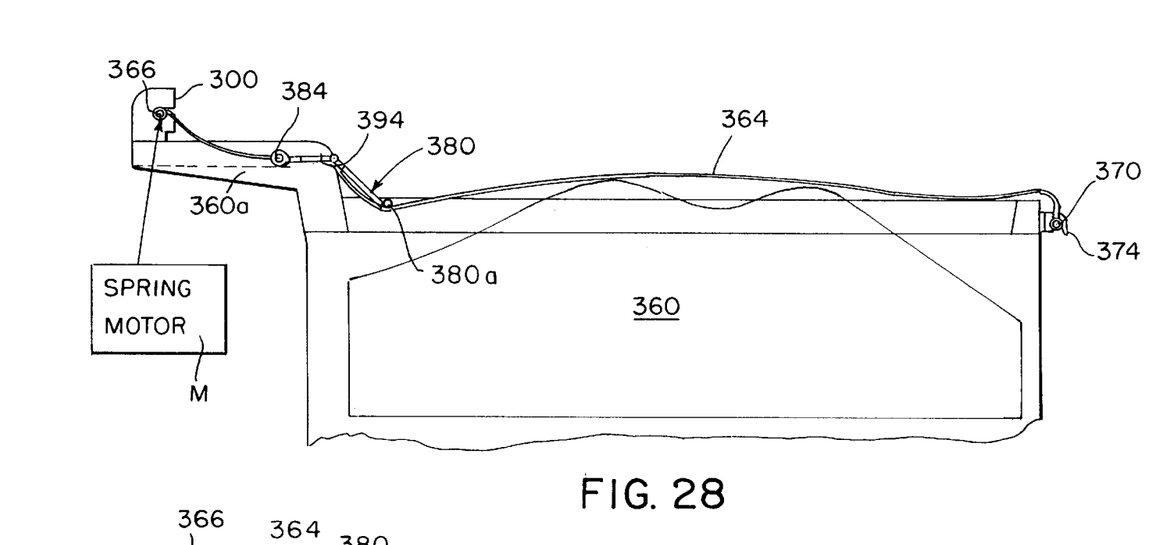
FIG. 28 is a diagrammatic view of a second embodiment of a tarp cover system using the hold-down means of the present invention when in the fully covered condition.
Figure 29:
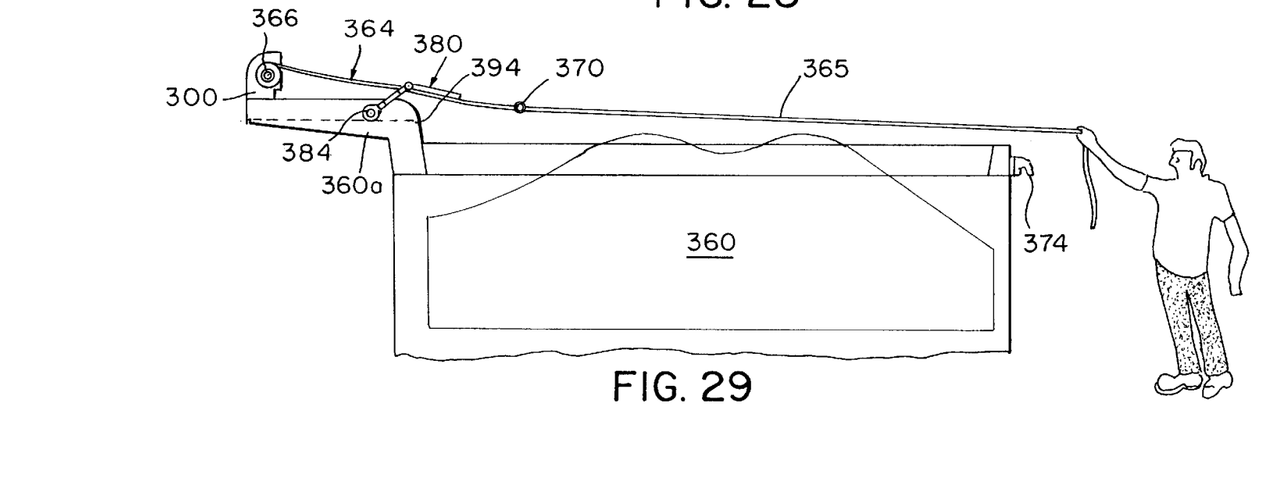
FIGS. 29–31 illustrate the successive steps for uncovering from the container the tarp cover of FIG. 28.
Figure 30:
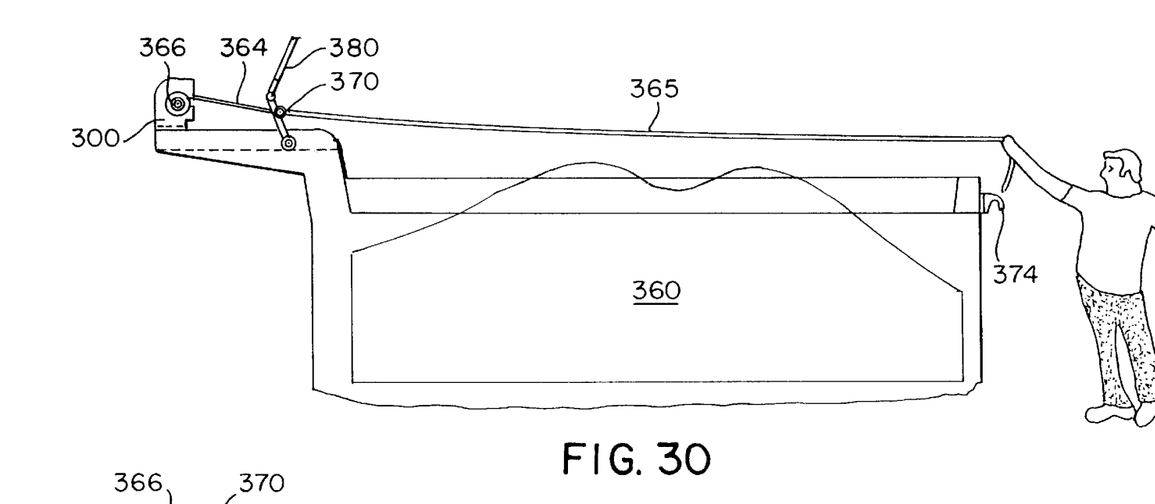
Figure 31:
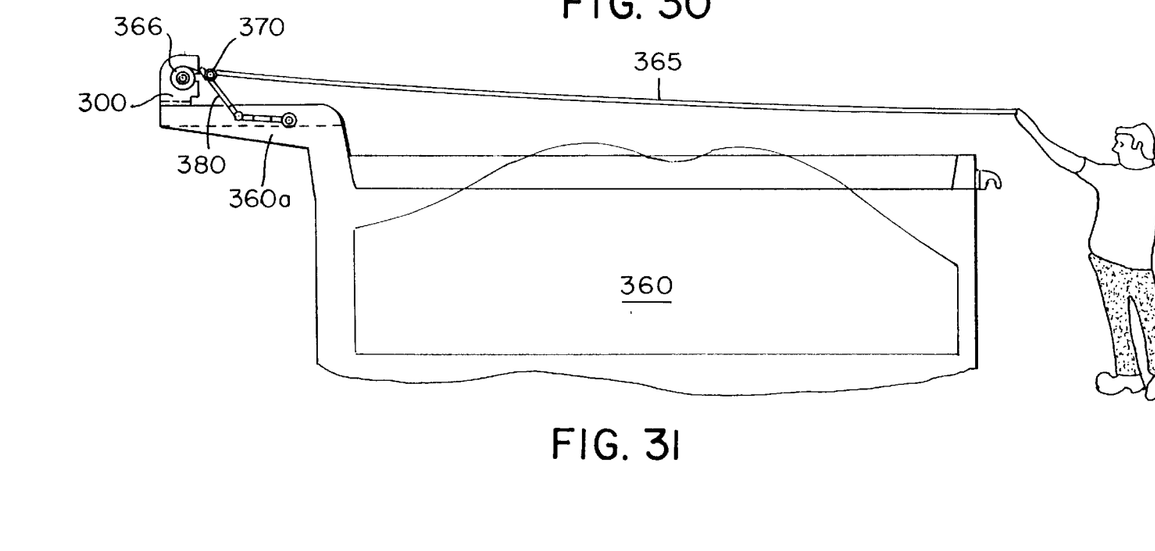

Referring now to FIGS. 28–31, a further embodiment of the invention is shown wherein the use of the pivoted tarp cover arm is eliminated, and a simple arrangement is provided having a transversely extending tarp pull bar 370, a manually operable rope 365, and a locking bracket 374 mounted on the rear wall of the vehicle body 360. Referring first to FIG. 28, when the tarp cover 364 is in its closed condition covering the open top of the vehicle body 360, the pull bar 370 is locked beneath the bracket 374, and the pull rope 365 is wound around the bracket 374. To uncover the vehicle body 360, the operator merely releases the pull rope 365, and the cover 364 is progressively wound upon the roll 366 which is driven by the motor means M. The roll 366 is supported by roll support 300 provided at the forward end of the cab shield 360a. In this embodiment, rather than being an electrical motor as in the embodiment of FIG. 13, the motor means M is a spring motor (such as a spiral spring as shown in FIG. 28). As the operator releases the Dull rope 365, the hold down arm 380 is pivoted in the counter clockwise direction about its spring-biased pivot means 384, and when the pull bar 370 engages the hold-down arm, it is farther pivoted in the counter-clockwise direction toward the final position of FIG. 31 with the pull bar 370 being adjacent the tarp cover roll 366. To again cover the vehicle container body 360, the operator merely manually pulls the pull rope 365 as shown in FIG. 31, and as the pull bar 370 progressively as displaced to the rear, the hold-down arm 380 is spring biased in the clockwise direction toward the hold down position of FIG. 28, thereby applying downward tension upon the forward end portion of the cover 364, and thereby tensioning the same relative to the rear edge 394 of the ledge. The pull rope 365 is then again wound around the bracket 374 to fasten the tarp cover 364 in its closed position. As in the embodiment of FIGS. 7 and 10, the transverse portion 380a (FIG. 28) of the hold-down arm has a length that is less than the spacing distance between the container side walls, whereby the hold-down arm is operable to extend partially within the container as shown in FIG. 28.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. A tarp cover system for an open-topped vehicle container body having front, rear, side and bottom walls, comprising:

(a) a flexible cover having first and second ends;

(b) a cylindrical cover roll for receiving said cover, said cover being connected with said cover roll;

(c) means for rotatably connecting said roll with the vehicle body adjacent and parallel with the container body front wall;

(d) drive means for rotating said roll in a first direction of rotation to cause said cover to be wound upon said roll, whereby said second end is exposed;

(e) means for withdrawing said second end rearwardly from said roll to cover the top of the container body;

(f) means for connecting said second end with the rear wall of the container body;

(g) a generally U-shaped inverted hold-down arm having a transverse portion parallel with said roll, and a pair of leg portions terminating in a pair of free ends, said hold-down arm transverse portion having a length that is less than the spacing distance between the container body side walls;

(h) a pair of pivot means for pivotally connecting the free ends of said leg portions with the container body adjacent the roll and intermediate the front and rear walls; and (i) hold-down spring means biasing said hold-down arm toward a first hold-down position in which said transverse portion is above and in engagement with a upper surface of said cover, thereby to hold down a front portion of the cover relative to the vehicle body.

2. A tarp cover system as defined in claim 1, wherein said cover roll is tubular, and further wherein said drive means includes an electric motor arranged collinearly relative to said cover roll, and planetary gearing means extending within said cover roll and driven by said electric motor.

3. A tarp cover system as defined in claim 1, wherein said means for withdrawing said second end from said cover roll includes a transverse member connected with said second end, and a manually operable pull rope connected at one end with said transverse member and extending at the other end beyond the rear wall of the container body.

\* \* \* \* \*